No. 658,502. Patented Sept. 25, 1900.
J. M. LAIRD.
GUTTER HANGER.
(Application filed Nov. 18, 1897.)
(No Model.)
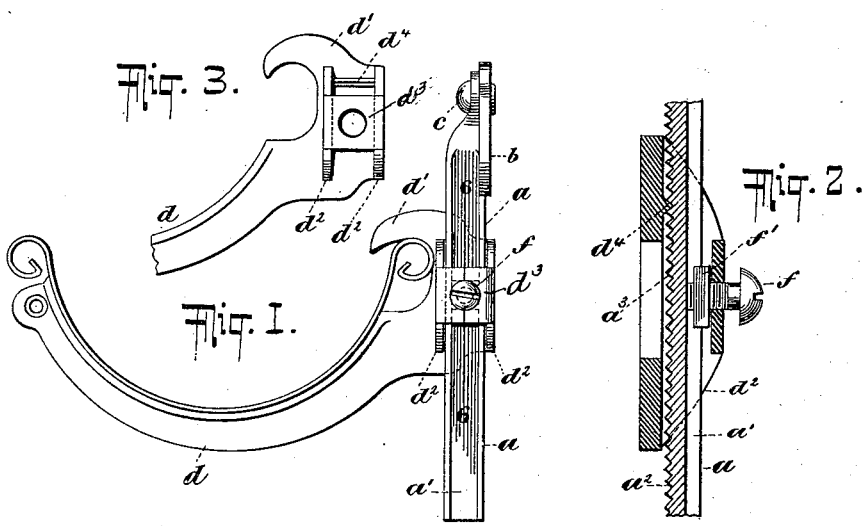
WITNESSES:
INVENTOR
John M. Laird
BY
his ATTORNEYS

UNITED STATES PATENT OFFICE.

JOHN M. LAIRD, OF HUNTINGDON, PENNSYLVANIA.

GUTTER-HANGER.

SPECIFICATION forming part of Letters Patent No. 658,502, dated September 25, 1900.

Application filed November 18, 1897. Serial No. 658,907. (No model.)

*To all whom it may concern:*

Be it known that I, JOHN M. LAIRD, a resident of Huntingdon, Huntingdon county, State of Pennsylvania, have invented a new and Improved Gutter-Hanger, of which the following is a specification.

My invention relates to gutter-hangers, and has for its object to produce a gutter-hanger of improved construction.

To this end my invention consists in the construction hereinafter claimed.

My invention will be understood by referring to the accompanying drawings, in which—

Figure 1 is a side view of a gutter-hanger embodying my invention. Fig. 2 is a section on line 6 6 of Fig. 1, and Fig. 3 is a detached view of a portion of the gutter-support.

In the drawings, $a$ is a suitable supporting-bracket, herein shown as a suspension-bar, which is shown in the present instance as provided with attaching-brackets $b$, secured thereto by a bolt $c$. This suspension-bar is grooved or recessed at one side to form a keyway $a'$ and roughened or toothed on the other side $a^2$. The gutter-support $d$, which is shown in the present instance as curved and provided with a hook $d'$, is adapted to receive and support a gutter. The gutter-support is likewise provided with guides $d^2$, which are joined by an apertured cross-bar $d^3$, and is also provided with a tooth $d^4$. The suspension-bar $a$ passes through the stirrup formed by the guides $d^2$ and their cross-bar $d^3$. The suspension-bar and gutter-support are shown as secured together by a screw $f$, which passes through the aperture in the stirrup of the gutter-support and engages the suspension-bar at a point at some distance from the tooth $d^4$, so that the tooth will act as a fulcrum and permit the bar $a$ to be firmly braced against the hanger by the screw $f$, which would not be the case if the tooth were directly beneath the screw. A nut $f'$ is carried on the screw and impinges against the inner face of the stirrup. The side walls of the groove $a'$ of the bar $a$ are of a height sufficient to act as stops to prevent the rotation of the nut $f'$. The screw-and-nut connection is very effective, and by using such a connection it will be unnecessary to cut a thread on the stirrup, which is frequently made of poor-grade cast metal.

What I claim, and desire to secure by Letters Patent, is—

In a gutter-hanger, the combination of a suspension-bar $a$ having a support $b$ therefor, a groove $a'$ therein and a toothed rear surface, a gutter-support $d$ having a stirrup composed of the guides $d^2$ for the suspension-bar and the apertured cross-bar $d^3$, and a tooth $d^4$ located to one side of the axis of the aperture of the cross-bar, a screw passing through the aperture of the cross-bar and a nut $f'$ on the screw and adapted to bear against the inner face of the cross-bar, the sides of the said nut abutting against the walls of the groove $a'$ of the suspension-bar which form stops to prevent rotation of the nut, whereby the suspension-bar and hanger will be firmly forced together by the screw or nut, the tooth $d^4$ acting as a fulcrum to receive the thrust of the suspension-bar, which suspension-bar also bears directly against the face of the gutter-support, thereby forming a rigid connection between the gutter-support and the suspension-bar, substantially as described and for the purposes set forth.

JOHN M. LAIRD.

Witnesses:
R. A. ORBISON,
B. F. FINK.